(12) United States Patent
Inai et al.

(10) Patent No.: US 7,527,882 B2
(45) Date of Patent: May 5, 2009

(54) METHOD FOR DETECTING UNDERSUPPLY OF FUEL GAS AND METHOD FOR CONTROLLING FUEL CELL

(75) Inventors: Shigeru Inai, Shioya-gun (JP); Chikara Iwasawa, Saitama (JP); Shinya Watanabe, Shioya-gun (JP); Masahiko Sato, Utsunomiya (JP); Yoshikazu Murakami, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 549 days.

(21) Appl. No.: 10/514,089

(22) PCT Filed: May 8, 2003

(86) PCT No.: PCT/JP03/05746

§ 371 (c)(1),
(2), (4) Date: Nov. 10, 2004

(87) PCT Pub. No.: WO03/096461

PCT Pub. Date: Nov. 20, 2003

(65) Prior Publication Data

US 2005/0208349 A1  Sep. 22, 2005

(30) Foreign Application Priority Data

May 10, 2002  (JP)  ............... 2002-135068

(51) Int. Cl.
*H01M 8/04*  (2006.01)
(52) U.S. Cl. .......................... 429/13; 429/23
(58) Field of Classification Search ................... 429/13, 429/23; 204/424–426
See application file for complete search history.

(56) References Cited

U.S. PATENT DOCUMENTS

| | | | |
|---|---|---|---|
| 4,171,253 A | 10/1979 | Nolan et al. | |
| 4,898,793 A | 2/1990 | Matsumura et al. | |

FOREIGN PATENT DOCUMENTS

| | | | |
|---|---|---|---|
| JP | 01003968 A | * | 1/1989 |
| JP | 02-051866 | | 2/1990 |
| JP | 06-243882 | | 9/1994 |
| JP | 07-022047 | | 1/1995 |
| JP | 07282832 A | * | 10/1995 |
| JP | 10-106602 | | 4/1998 |
| JP | 11-260388 | | 9/1999 |
| JP | 2001338667 A | * | 12/2001 |
| WO | WO-01/15255 A2 | | 3/2001 |

OTHER PUBLICATIONS

IPDL Machine Translation of JP 07-282832A.*
IPDL Machine Translation of JP 2001-338667A.*

* cited by examiner

*Primary Examiner*—Gregg Cantelmo
(74) *Attorney, Agent, or Firm*—Lahive & Cockfield, LLP; Anthony A. Laurento (57) ABSTRACT

A reference electrode is provided adjacent to an anode of a membrane electrode assembly. The potential difference between the reference electrode and the anode is measured by a control unit. The control unit compares the measured value and a map of the anode potential difference stored in the control unit. When the measured value indicates a relation line which is different from a reference line indicating that the fuel gas is sufficient, it is judged that shortage of the fuel gas occurs.

8 Claims, 6 Drawing Sheets

METHOD FOR DETECTING UNDERSUPPLY OF FUEL GAS AND METHOD FOR CONTROLLING FUEL CELL

RELATED APPLICATIONS

This application is a 35 U.S.C. 371 national stage filing of International Application No. PCT/JP03/05746, filed 8 May 2003, which claims priority to Japan Patent Application No. 2002-135068 filed on 10 May 2002, in Japan. The contents of the aforementioned applications are hereby incorporated by reference.

BACKGROUND OF THE INVENTION

The present invention relates to a method for detecting undersupply of a fuel gas and method for controlling a fuel cell in which the fuel gas is supplied to an anode on one surface of an electrolyte, and an oxygen-containing gas is supplied to a cathode on the other surface of the electrolyte for performing power generation.

For example, a solid polymer fuel cell employs an electrolyte electrode assembly (membrane electrode assembly) which includes anode and cathode, and an electrolyte (electrolyte membrane) interposed between the anode and the cathode. The electrolyte membrane is a polymer ion exchange membrane (proton ion exchange membrane). The electrolyte electrode assembly is sandwiched between separators. The electrolyte electrode assembly and the separators make up a unit of a fuel cell. A predetermined number of fuel cells are stacked together to form a fuel cell stack.

In the fuel cell stack, a fuel gas such as a gas chiefly containing hydrogen (hereinafter also referred to as the hydrogen-containing gas) is supplied to the anode. The catalyst of the anode induces a chemical reaction of the fuel gas to split the hydrogen molecule into hydrogen ions and electrons. The hydrogen ions move toward the cathode through the electrolyte, and the electrons flow through an external circuit to the cathode, creating a DC electric current. A gas chiefly containing oxygen (hereinafter also referred to as the oxygen-containing gas) is supplied to the cathode. At the cathode, the hydrogen ions from the anode combine with the electrons and oxygen to produce water.

Normally, the amount of fuel gas supplied to the fuel cell is measured by a gas flow rate meter. The supply of the fuel gas to the fuel cell is constantly controlled such that the amount of the fuel gas corresponds to the load at the time of operating the fuel cell.

When the fuel cell is used in a vehicle application, in order to reduce the cost and size of the fuel cell, it is necessary to operate the fuel cell without any instruments for measuring the amount of the fuel gas supplied to the fuel cell.

However, since there is no means for detecting whether the sufficient amount of fuel gas for power generation is supplied to the fuel cell or not, the shortage of the stoichiometry (the shortage of the fuel gas) may occur undesirably, in particular, at the time of operating the fuel cell for the high load. Therefore, the power generation performance is significantly low.

In an attempt to solve the problem, Japanese laid-open patent publication No. 6-243882 discloses a method for stopping protection of a fuel cell power generation apparatus. According to the disclosure, a fuel cell stack is regarded as a plurality of cell assemblies each including a plurality of unit cells. The output voltages of the respective cell assemblies are detected. When the lowest detected voltage is decreased by a certain voltage, the protection of the fuel cell power generation apparatus is stopped regardless of the level of the electrical power required for the load.

However, in the above conventional technique, since the fuel cell stack is divided into cell assemblies, and the voltages of the respective cell assemblies are detected using a plurality of voltage detectors, and each of the detected values are compared with a predetermined value indicating a protection level. Therefore, the apparatus has a considerably complicated structure, and is large as a whole. Therefore, the cost of the apparatus is high.

SUMMARY OF THE INVENTION

The present invention solve this type of problem, and an object of the present invention is to provide a method for detecting undersupply of a fuel gas which makes it possible to detect shortage of the fuel gas at an anode with a simple and economical structure.

Another object of the present invention is to provide a method for controlling a fuel cell such that the fuel cell is operated in the optimum operating condition in various electrical current conditions with a simple and economical structure.

In the method for detecting undersupply of the fuel cell according to the present invention, a reference line showing relationship between a potential difference and electrical current is set. The potential difference is a difference between a potential of a reference electrode provided adjacent to an anode on an electrolyte and a potential of the anode. When the relationship between the detected potential difference and the electrical current indicates a relation line which is different from the reference line, it is judged that shortage of the fuel gas supplied to the anode occurs.

Specifically, the potential difference between the reference electrode and the anode (hereinafter also referred to as the anode potential difference) is measured for every load (electrical current) of the fuel cell. At this time, when the amount of the fuel gas supplied to the anode is sufficient for power generation, the anode potential difference varies linearly. Therefore, the linear variation is determined as the reference line.

In contrast, if the amount of the fuel gas supplied to the anode is not sufficient, the potential difference between the reference electrode and the anode varies non-linearly depending on the degree of shortage in the amount of the fuel gas. If the shortage of the fuel gas (hydrogen) with respect to the electrical current in the power generation surface of the electrolyte electrode assembly occurs, reaction other than the decomposition reaction of hydrogen ($H_2 \rightarrow 2H^2 + 2e^-$), for example, decomposition reaction of water or oxidation reaction of carbon or the like occurs easily. Therefore, it is presumed that the potential in the anode gets higher than the potential of the standard hydrogen electrode due to the shortage of hydrogen.

Therefore, it is possible to easily and reliably judge the condition of the fuel gas in the anode, i.e., whether the amount of the fuel gas is sufficient or not by measuring the tendency in the change of the detected potential at the reference electrode connected to the anode (whether the change of the detected potential matches the reference line or not).

Further, in the control method according to the present invention, a reference line showing relationship between a potential difference and electrical current is determined. The potential difference is a difference between a potential of a reference electrode provided adjacent to the anode on the electrolyte and the anode. Further, it is judged that shortage of the fuel gas supplied to the anode occurs when the potential difference is detected as showing a relation line different from the reference line. When shortage of the fuel gas occurs, the flow rate of the fuel gas supplied to the anode is increased, or the electrical current is decreased.

Thus, the shortage of the fuel gas is reliably detected, and the amount of the fuel gas or the electrical current value is adjusted based on the detection result. Consequently, with the simple and economical structure, the control of the fuel cell is efficiently carried out, and the utilization ratio of the fuel gas is improved.

DESCRIPTION OF ILLUSTRATED EMBODIMENTS

Figure 1:
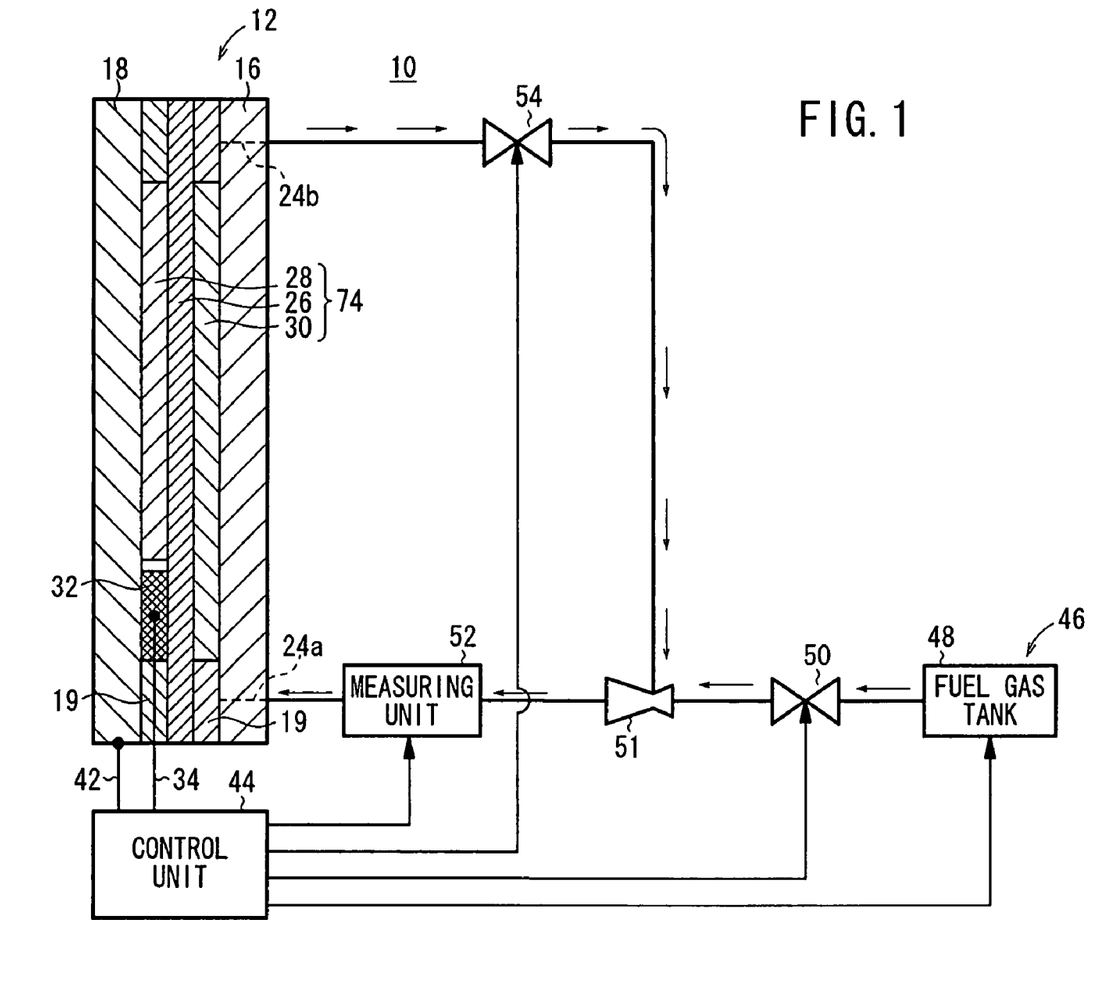
FIG. 1 is a view schematically showing a fuel cell system for carrying out a method according to an embodiment of the present invention.
Figure 2:
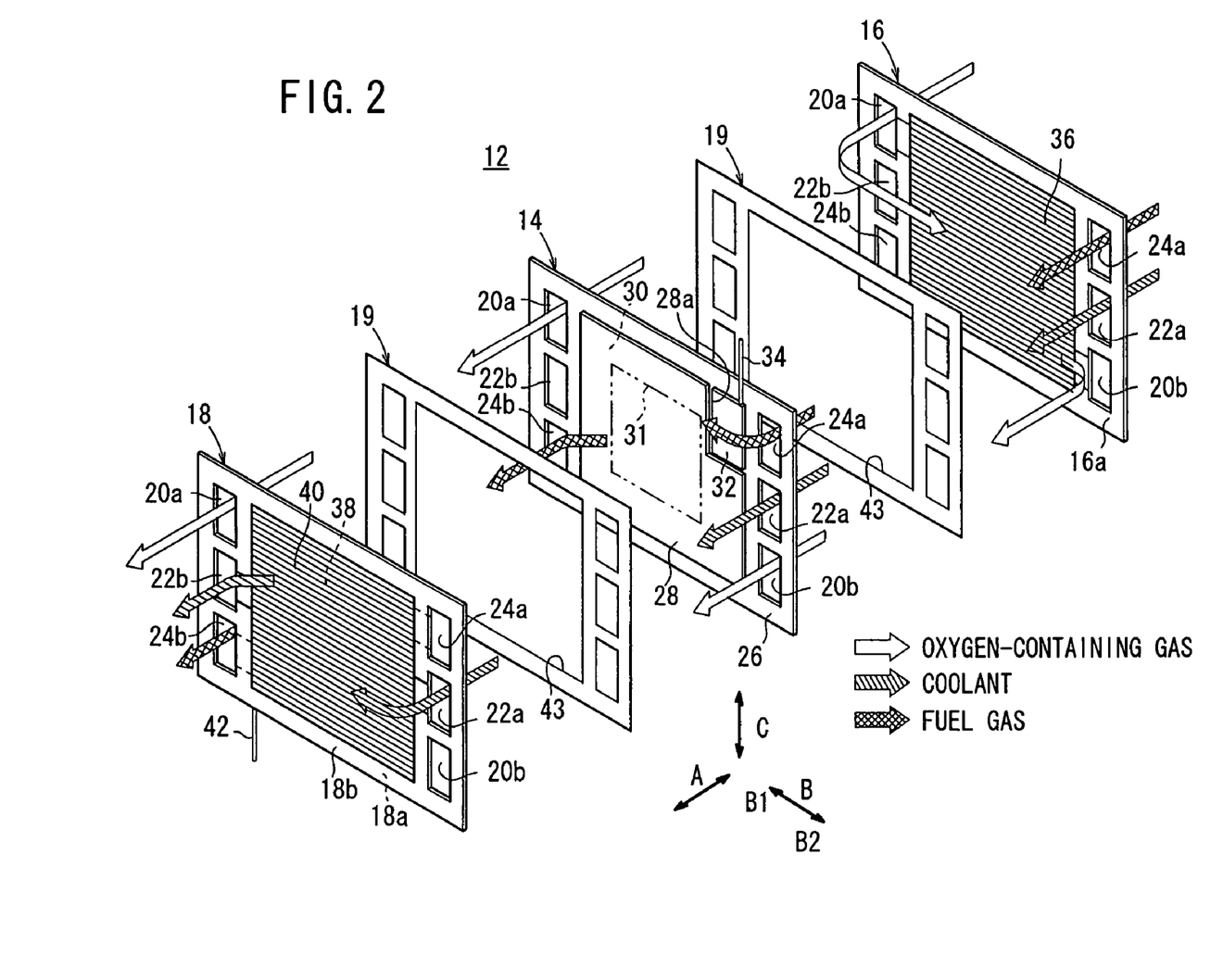
FIG. 2 is an exploded perspective view showing main components of a fuel cell used in the fuel cell system.

FIG. 1 is a view schematically showing a fuel cell system 10 for carrying out a method according to an embodiment of the present invention. FIG. 2 is an exploded perspective showing main components of a fuel cell 12 used in the fuel cell system 10.

The fuel cell 12 includes a membrane electrode assembly (electrolyte electrode assembly) 14, and first and second separators 16, 18 sandwiching the membrane electrode assembly 14. Seal members 19 such as gaskets are interposed between the membrane electrode assembly 14 and the first and second separators 16, 18, around passages and electrode surfaces (power generation surfaces) as described later.

At one end of the fuel cell 12 in a horizontal direction indicated by an arrow B shown in FIG. 2, an oxygen-containing gas supply passage 20a for supplying an oxidizing gas such as an oxygen-containing gas, and a coolant discharge passage 22b, and a fuel gas discharge passage 24b for discharging a fuel gas such as a hydrogen-containing gas are formed. The oxygen-containing gas supply passage 20a, the coolant discharge passage 22b, and the fuel gas discharge passage 24b extend through the fuel cell 12 in a stacking direction indicated by an arrow A.

At the other end of the fuel gas in the direction indicated by the arrow B, a fuel gas supply passage 24a for supplying the fuel gas, a coolant supply passage 22a for supplying the coolant, and the oxygen-containing gas discharge passage 20b for discharging the oxygen-containing gas are formed. The fuel gas supply passage 24a, the coolant supply passage 22a, and the oxygen-containing gas discharge passage 20b extend through the fuel cell in the direction indicated by the arrow A.

The membrane electrode assembly 14 comprises an anode 28, a cathode 30, and a solid polymer electrolyte membrane (electrolyte) 26 interposed between the anode 28 and the cathode 30. The solid polymer electrolyte membrane 26 is formed by impregnating a thin membrane of perfluorosulfonic acid with water, for example.

Each of the anode 28 and the cathode 30 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively. Each of the seal members 19 has an opening 43 for receiving the anode 28 and the cathode 30.

The anode 28 of the membrane electrode assembly 14 has a cutout 28a outside a power generation area 31 near the fuel gas supply passage 24a as a fuel gas supply inlet. A reference electrode 32 is tightly attached to the solid polymer electrolyte membrane 26 at the cutout 28a. An end of a lead wire 34 is connected to the reference electrode 32. The reference electrode 32 and the second separator 18 are insulated. The reference electrode 32 is made of platinum, and has a ribbon shape, for example.

The first separator 16 has an oxygen-containing gas flow field 36 on its surface 16a facing the membrane electrode assembly 14. For example, the oxygen-containing gas flow field 36 includes a plurality of grooves extending in the direction indicated by the arrow B. The oxygen-containing gas flow field 36 is connected to the oxygen-containing gas supply passage 20a and the oxygen-containing gas discharge passage 20b.

Figure 3:
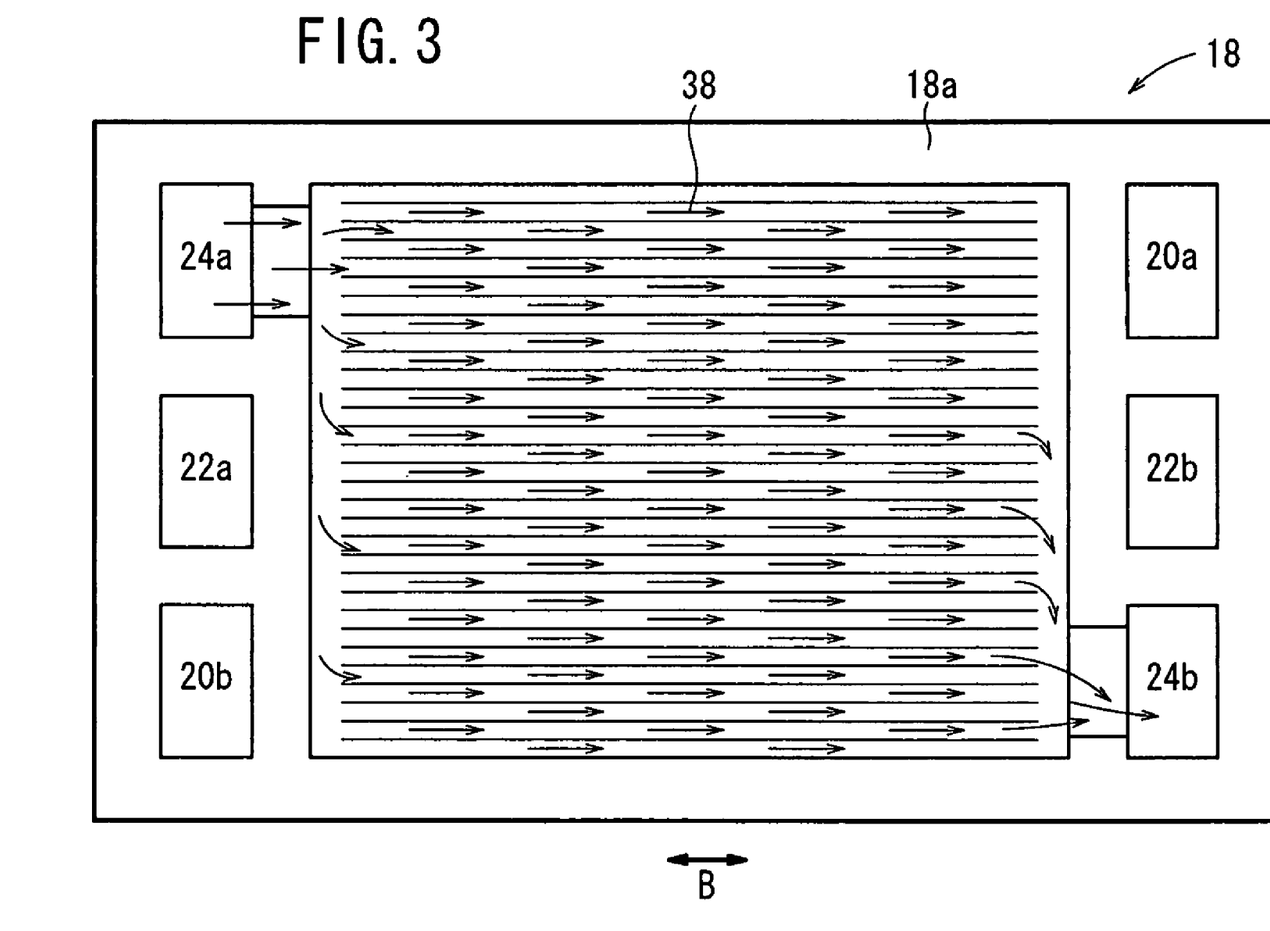
FIG. 3 is a front view showing a second separator of the fuel cell.

The second separator 18 has a fuel as flow field 38 on its surface 18a facing the membrane electrode assembly 14. As shown in FIG. 3, the fuel gas flow field 38 is connected to the fuel gas supply passage 24a and the fuel gas discharge passage 24b. The fuel gas flow field 38 includes a plurality of grooves extending in the direction indicated by the arrow B.

As shown in FIG. 2, the separator 18 has a coolant flow field 40 connected to the coolant supply passage 22a and the coolant discharge passage 22b. The coolant flow field 40 includes a plurality of grooves extending in the direction indicated by the arrow B. An end of a lead wire 42 is connected to the second separator 18 as an anode separator.

Preferably, the lead wire 42 is provided at a region where shortage of the fuel gas is likely to occur. Specifically, it is desirable to provide the lead wire 42 near an outlet of the fuel gas flow field 38. When a plurality of fuel cells 12 are stacked together, it is desirable to provide the lead wire 42 on the separator at the deepest position from the fuel gas supply port of the fuel gas supply passage.

As shown in FIG. 1, the fuel cell system 10 includes a control unit 44 connected to the lead wires 34, 42 for constantly measuring the anode potential difference between the reference electrode 32 and the second separator 18. The control unit 44 controls a fuel gas supply unit 46 and an oxygen-containing gas supply unit (not shown).

The fuel gas supply unit 46 includes a fuel gas tank 48. The fuel gas tank 48 is connected to the fuel gas supply passage 24a of the fuel cell 12 through a flow rate control valve 50, an injector 51, and a power generation condition measuring unit 52. The fuel gas discharge passage 24b of the fuel cell 12 is connectable to a gas intake port of the injector 51 through a pressure control valve 54.

Next, operation of the fuel cell 12 and the fuel cell system 10 including the fuel cell 12 will be described.

As shown in FIG. 2, a fuel gas such as a hydrogen-containing gas is supplied to the fuel gas supply passage 24a, and an oxidizing gas such as an oxygen-containing gas is supplied to the oxygen-containing gas supply passage 20a. Further, a coolant such as pure water, an ethylene glycol or an oil is supplied to the coolant supply passage 22a.

The oxygen-containing gas from the oxygen-containing gas supply passage 20a flows into the oxygen-containing gas flow field 36 of the first separator 16, and flows along the cathode 30 of the membrane electrode assembly 14. Likewise, the fuel gas from the fuel gas supply passage 24a flows into the fuel gas flow field 38 of the second separator 18, and flows along the anode 28 of the membrane electrode assembly 14.

In the membrane electrode assembly 14, the oxygen-containing gas supplied to the cathode 30, and the fuel gas supplied to the anode 28 are consumed in the electrochemical reactions at catalyst layers of the cathode 30 and the anode 28 for generating electricity.

Then, the fuel gas consumed at the anode 28 is discharge into the fuel gas discharge passage 24b, and flows in the direction indicated by the arrow A. Likewise, the oxygen-containing gas consumed at the cathode 30 is discharged into the oxygen-containing gas discharge passage 20b, and flows in the direction indicated by the arrow A.

The coolant supplied to the coolant supply passage 22a flows into the coolant flow field 40 of the second separator 18, and flows in the direction indicated by the arrow B. After the coolant is used for cooling the membrane electrode assembly 14, the coolant is discharged into the coolant discharge passage 22b.

Next, using the fuel cell system 10, the method for detecting undersupply of a fuel gas and method for controlling a fuel cell according to the embodiment of the present invention will be described below.

Figure 4:
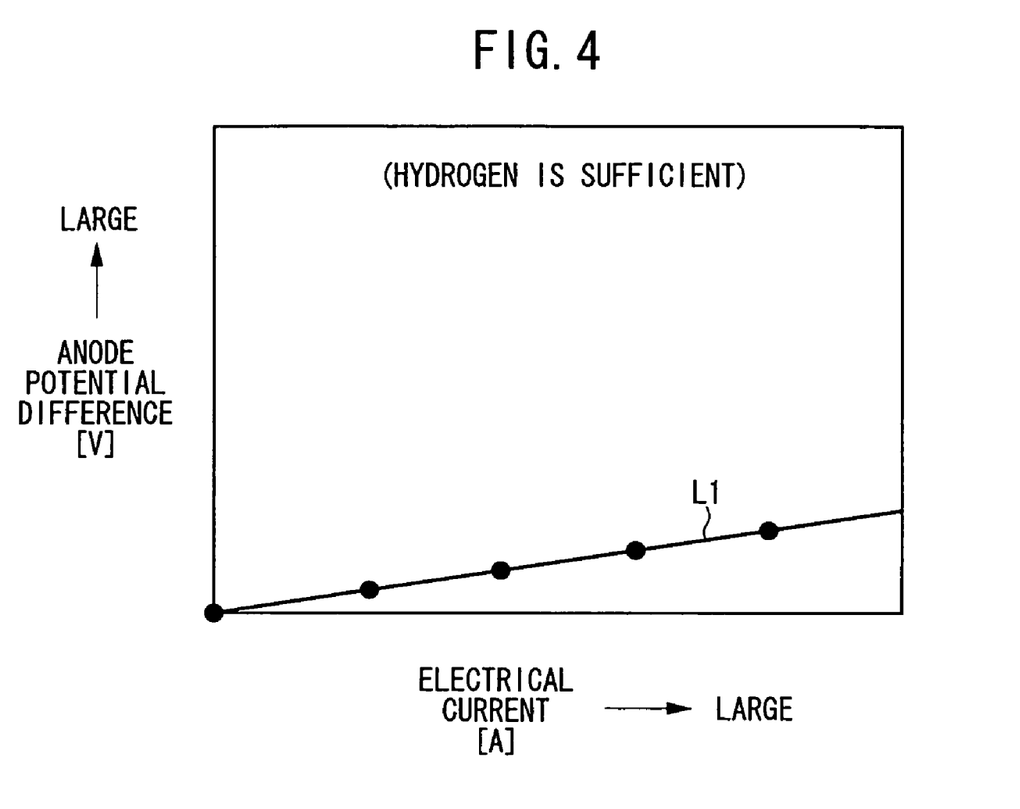
FIG. 4 is a view showing relationship between the anode potential difference and the electrical current when a fuel gas is supplied sufficiently.

During operation of the fuel cell 12, as shown in FIG. 1, the potential of the reference electrode 32 and the potential of the anode 28 (second separator 18) are inputted to the control unit 44 through the lead wires 34, 42, respectively. The potential difference is constantly measured. The measured values are plotted on a graph where the abscissa axis indicates the value of the electrical current, and the ordinate axis indicates the value of the anode potential difference. If the amount of the fuel gas supplied to the anode 28 is sufficient for power generation, the value of the anode potential difference changes linearly as the value of the electrical current changes as shown by a reference line L1 (see FIG. 4). The slope of the reference line L1 depends on electrical resistances of the anode 28 and the second separator 18.

Figure 5:
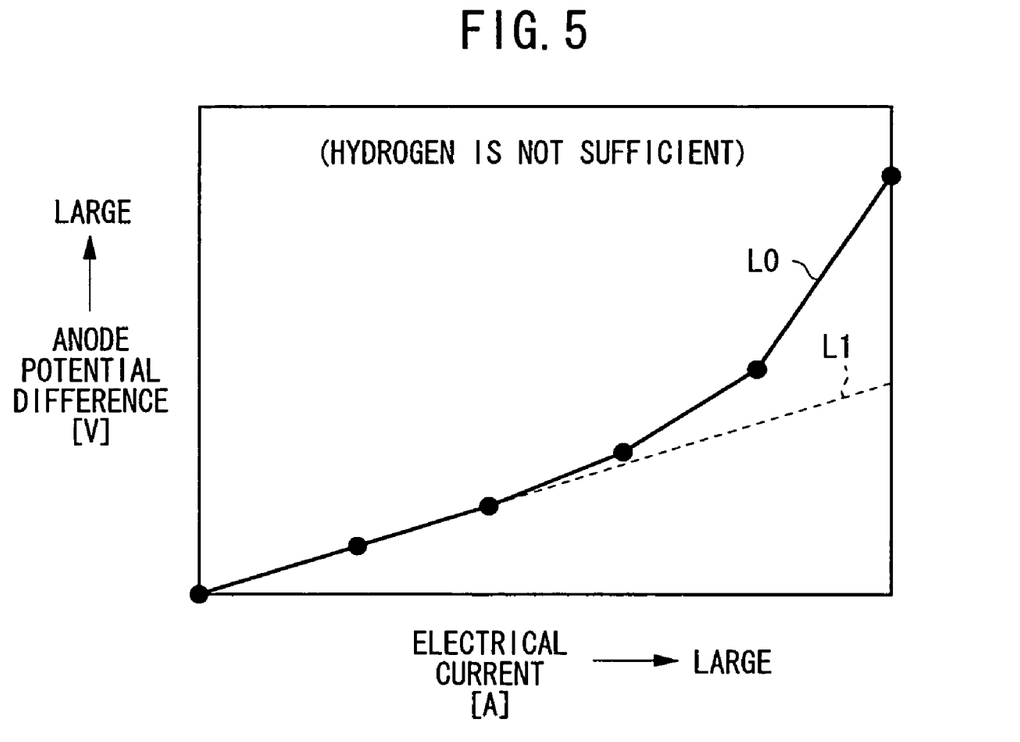
FIG. 5 is a view showing relationship between the anode potential difference and the electrical current when shortage occurs in the supply of the fuel gas.

In contrast, if the amount of the fuel gas supplied to the anode 28 is not sufficient, the anode potential difference varies along a relation line L0 which is different from the reference line L1, depending on the degree of the shortage of the fuel gas (see FIG. 5). The difference between the reference line L1 and the relation line L0 occurs when the amount of hydrogen is small in comparison with the amount of the electrical current flowing on the power generation surface of the membrane electrode assembly 14. Specifically, if hydrogen is not supplied sufficiently, reactions other than decomposition of hydrogen, such as decomposition reaction of water or oxidation reaction of carbon occurs easily. Therefore, it is presumed that the potential in the anode 28 gets higher than the potential of the standard hydrogen electrode due to the shortage of hydrogen.

Figure 6:
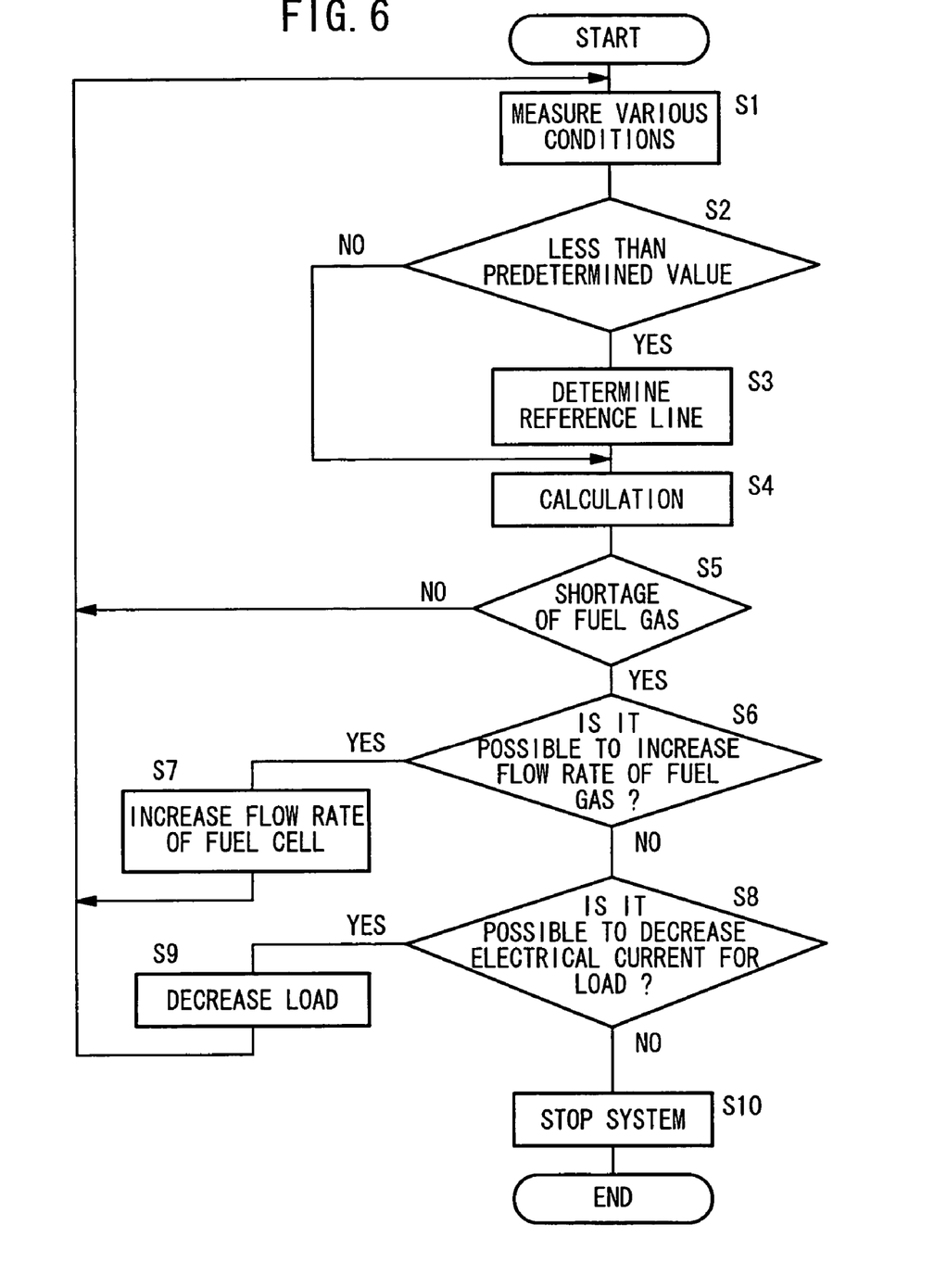
FIG. 6 is a flowchart showing processes for carrying out the method according to the embodiment of the present invention.

Next, the method according to the embodiment of the present invention will be described with reference to a flowchart shown in FIG. 6.

Firstly, the power generation condition measuring unit 52 measures various power generation conditions (step S1). Specifically, the power generation condition measuring unit 52 measures various power generation conditions such as humidity, temperature, and pressure of the fuel gas. Then, the control unit 44 calculates the current density of the fuel cell 12 to determine whether the current density is less than a predetermined value. If the calculated current density is less than the predetermined value, i.e., if the fuel cell 12 is in operation for a high load (YES in step S2), the control passes to step S3.

If the calculated current density is greater than the predetermined value, i.e., if the fuel cell 12 is in normal operation (NO in step S2), the control passes to step S4 for comparing the reference line L1 and the actually detected anode potential difference. Data of the reference line L1 is stored in the control unit 44 as a map.

If the relationship between the actual anode potential difference and the electrical current is detected as the relation line L0 which is different from the reference line L1, i.e., if there is a deviation from a straight line, and the deviation is greater than a certain value (see FIG. 5), in step S5, it is determined that there is shortage of the fuel gas (YES in step S5). Thus, the control passes to step S6 for determining whether it is possible to increase the flow rate of the fuel gas in the fuel cell system 10.

In the fuel cell 12, if it is possible to increase the flow rate of the fuel gas (YES in step S6), the control passes to step S7. In step S7, the control unit 44 controls the flow rate control valve 50, and the pressure control valve 54 and the like for increasing the amount of the fuel gas supplied from the fuel gas tank 48 to the fuel cell 12.

If it is determined that it is not possible to increase the flow rate of the fuel gas (NO in step S6), the control passes to step S8. In step S8, it is determined that whether it is possible to decrease the electrical current of the fuel cell 12. If it is possible to decrease the electrical current for the load (YES in step S8), the control passes to step S9 for suppressing the electrical current outputted from the fuel cell 12. If it is not possible to decrease the electrical current for the load (NO in step S8), the control passes to step S10 for stopping the operation of the fuel cell system 10.

If it is determined that the fuel cell 12 is in operation for a high load in step S2, the anode potential difference is detected in step S3, and the reference line L1 is determined by linear approximation. Then, the processes from step S4 will be carried out based on the newly determined reference line L1.

In the embodiment of the present invention, the reference electrode 32 is provided at the anode 28. The potential difference between the reference electrode 32 and the second separator 18 as the anode separator is constantly measured by the control unit 44. The measured valued is compared with the map of the anode potential difference, i.e., the reference line L1. The map of the anode potential difference is stored in the control unit 44. In this manner, the shortage of the fuel gas in the anode 28 is reliably detected.

Thus, with the simple structure and control, the judgment as to whether the amount of the fuel gas is sufficient or not can be carried out accurately. Therefore, the air flow rate meter which has been used in the conventional system is not required. Accordingly, it is possible to produce a compact fuel cell system 10 economically, and the utilization ratio of the fuel gas is improved. Further, the desired power generation performance of the fuel cell 12 is reliably maintained.

Further, in the embodiment of the present invention, when it is detected that the amount of the fuel gas is not sufficient, the flow rate of the fuel gas is increased, or the electric current is decreased, for example. Thus, the control of the fuel cell 12 is carried out simply and efficiently with the simple structure. The fuel cell 12 is operated in a suitable condition, and the desired power generation performance is maintained.

In the method for detecting undersupply of a fuel gas according to the present invention, a reference line indicating relationship between the potential detected at the reference electrode connected to the anode and the electrical current is determined. When the detected potential and the electrical current shows a relation line different from the reference line, it is determined the shortage of the fuel gas occurs at the anode.

Thus, with the simple control and structure, the under supply of the fuel gas is reliably detected, and the utilization ratio of the fuel gas is improved.

Further, in the method for controlling the fuel cell according to the present invention, when undersupply of the fuel gas is detected at the anode, the flow rate of the fuel gas supplied to the anode is increased, or the electrical current is decreased. Thus, the utilization ratio of the fuel gas is effectively improved. The fuel cell can be operated in the optimum operating condition in various electrical current conditions.

The invention claimed is:

1. A method for detecting undersupply of a fuel gas in power generation by supplying the fuel gas to an anode provided on one surface of an electrolyte and supplying an oxygen-containing gas to a cathode provided on the other surface of said electrolyte, said method comprising the steps of:

setting a substantially straight reference line showing a relationship between a potential difference and an electrical current, said potential difference being a potential difference between a reference electrode provided adjacent to said anode on said electrolyte and said anode; and judging that shortage of said fuel gas supplied to said anode occurs when said potential difference is detected as showing a relation line that has a portion the same as said straight reference line and a portion deviating from said straight reference line such that the deviating portion shows a larger potential difference than the straight reference line as the electrical current increases.

2. A method for detecting undersupply according to claim 1, wherein said reference electrode is provided adjacent to a fuel gas supply inlet.

3. A method for detecting undersupply according to claim 1, wherein said reference line is stored as a map, and a second reference line is determined by linear approximation when current density at the time of power generation is calculated and the calculated current density is less than a predetermined value.

4. A method for controlling a fuel cell for performing power generation by supplying a fuel gas to an anode provided on one surface of an electrolyte and supplying an oxygen-containing gas to a cathode provided on the other side of said electrolyte, said method comprising the steps of:

setting a substantially straight reference line showing a relationship between a potential difference and an electrical current, said potential difference being a potential difference between a reference electrode provided adjacent to said anode on said electrolyte and said anode;

judging that shortage of said fuel gas supplied to said anode occurs when said potential difference is detected as showing a relation line that has a portion the same as said straight reference line and a portion deviating from said straight reference line such that the deviating portion shows a larger potential difference than the straight reference line as the electrical current increases; and changing an operating condition of said fuel cell when it is judged that shortage of said fuel gas occurs.

5. A control method according to claim 4, wherein said reference electrode is provided adjacent to a fuel gas supply inlet.

6. A control method according to claim 4, wherein said step of changing an operating condition of said fuel cell comprises the step of increasing a flow rate of said fuel gas.

7. A control method according to claim 4, wherein said step of changing an operating condition of said fuel cell comprises the step of decreasing the electrical current.

8. A control method according to claim 4, wherein said step of changing an operating condition of said fuel cell comprises the step of stopping operation of said fuel cell.

* * * * *